United States Patent
Cardinale et al.

(10) Patent No.: US 10,124,261 B1
(45) Date of Patent: Nov. 13, 2018

(54) GROUP-JUDGED MULTIMEDIA COMPETITION

(71) Applicant: TwoTube, LLC, Chicago, IL (US)

(72) Inventors: Michael Cardinale, Chicago, IL (US); Richard Melville, Montclair, NJ (US); Jeffrey Gillard, North Haledon, NJ (US); William Gillard, Appleton, WI (US); Timothy Gillard, University City, MO (US); Thomas Gillard, Milwaukee, WI (US)

(73) Assignee: TWOTUBE, LLC, Chicago, IL (US)

( * ) Notice: Subject to any disclaimer, the term of this patent is extended or adjusted under 35 U.S.C. 154(b) by 0 days.

(21) Appl. No.: 15/652,171

(22) Filed: Jul. 17, 2017

Related U.S. Application Data

(63) Continuation-in-part of application No. 14/593,074, filed on Jan. 9, 2015, now Pat. No. 9,707,474.

(51) Int. Cl.
| | |
|---|---|
| *G07F 17/32* | (2006.01) |
| *A63F 13/80* | (2014.01) |
| *A63F 13/795* | (2014.01) |
| *A63F 13/335* | (2014.01) |
| *A63F 13/75* | (2014.01) |
| *A63F 13/44* | (2014.01) |
| *A63F 13/46* | (2014.01) |

(52) U.S. Cl.
CPC ............ *A63F 13/80* (2014.09); *A63F 13/335* (2014.09); *A63F 13/44* (2014.09); *A63F 13/46* (2014.09); *A63F 13/75* (2014.09); *A63F 13/795* (2014.09)

(58) Field of Classification Search
CPC ...................................................... G07F 17/32
See application file for complete search history.

(56) References Cited

U.S. PATENT DOCUMENTS

| | | |
|---|---|---|
| 6,968,243 B1 | 11/2005 | Oh |
| 7,827,054 B2 | 11/2010 | Campbell et al. |
| 8,162,758 B1 | 4/2012 | Powers et al. |
| 8,649,889 B2 | 2/2014 | Cacciolo |
| 8,678,932 B2 | 3/2014 | Alman et al. |
| 2008/0126197 A1 | 5/2008 | Savage et al. |
| 2008/0248873 A1 | 10/2008 | Lang |
| 2009/0083254 A1 | 3/2009 | Rossides |
| 2010/0257030 A1 | 10/2010 | Crocker |
| 2012/0123948 A1 | 5/2012 | Fefer et al. |

(Continued)

OTHER PUBLICATIONS

Tetrafusion "Cover Video" Contest!; https://www.facebook.com/notes/tetrafusion/tetrafusion-cover-video-contest/203578053007993; pp. 1-2; Apr. 4, 2011; Last Accessed Sep. 1, 2014.

(Continued)

*Primary Examiner* — Omkar Deodhar
(74) *Attorney, Agent, or Firm* — Middleton Reutlinger

(57) ABSTRACT

Methods and apparatus related to executing an online multimedia game. Some implementations are directed to a method for determining a matchup of two players, receiving multimedia selections from the players of the matchup, providing the selections to other players, and determining a winner of the matchup based on ratings provided by the other players. Some implementations are directed to prompting one player of the matchup for a multimedia subject for the multimedia selections and receiving either a multimedia subject or a deferral to the other player of the matchup for selection of a multimedia subject.

17 Claims, 8 Drawing Sheets

(56) References Cited

U.S. PATENT DOCUMENTS

2013/0184082 A1  7/2013  Patchen
2014/0228125 A1  8/2014  Tsang

OTHER PUBLICATIONS

TalentWatch—Featured Contest; https://www.talentwatch.net/contest; pp. 1-7; Last Accessed Sep. 1, 2014.

Wolf, Isabella; NFL Coin Flip: Why Do Teams Choose to Defer?; http://isabellawolf.hubpages.com/hub/Coin-Flip-To-Defer-Or-Not-To-Defer-That-ls-The-Question; pp. 1-3; Jan. 18, 2012; Last Accessed Sep. 1, 2014.

| Home Player | Visitor Player | Judge |
|---|---|---|
| Alice | Bob | Chris |
| Alice | Chirs | Bob |
| Bob | Alice | Chris |
| Bob | Chris | Alice |
| Chris | Alice | Bob |
| Chris | Bob | Alice |

FIG. 2

GROUP-JUDGED MULTIMEDIA COMPETITION

BACKGROUND

Users may access online publically available multimedia presentations. For example, users may access video and/or audio from one or more providers. One or more of the users may have interest in sharing videos and/or audio that was accessed via a multimedia provider with one or more other users. For example, a user may view a video, find the video entertaining, and have interest in providing the video to one or more other users.

SUMMARY

The present disclosure is directed generally to various methods and systems for executing an online game. In various implementations, executing the online game comprises: transmitting prompts and/or other digital content to various client computing devices of users participating in the online game; and receiving, in response to providing the digital content, selections, ratings and/or other responsive user interface input from the various client computing devices and/or additional client computing devices. The transmitting and/or receiving can optionally be performed by one or more server computing devices, such as a collection of one or more server computing devices operating remotely from the client computing devices (e.g., one or more server devices in the "cloud").

In some of those various implementations, a sequence of interactions with various client computing devices is performed, where each of the later in the sequence interactions is dynamically tailored based on one or more (e.g., all) of the earlier in the sequence interactions. For example, a first interaction in a sequence can include transmitting a first prompt to a first client computing device, where the first prompt solicits provision of a multimedia subject. The first interaction can further include receiving, from the first client computing device in response to providing the prompt, a selection or other user interface interaction responsive to the prompt. The second interaction in the sequence can include transmitting a second prompt to a second client computing device, where the second prompt is dynamically tailored based on the selection or other user interface interaction received from the first client computing device in response to providing the prompt. The second interaction can further include receiving, from the second client computing device in response to providing the second prompt, a selection or other user interface interaction responsive to the second prompt. Yet further interactions can occur, with the first and/or second client computing devices—and/or other client computing devices, and can likewise be dynamically tailored based on one or more prior interactions. For example, digital content can be transmitted to other client computing devices of one or more users deemed judges, where the digital content is tailored based on the user interface interactions received in response to the first prompt, the second prompt, and/or other prompts.

In these and other manners, downstream interactions are dynamically tailored based on upstream interaction(s). Moreover, in many implementations, prompts and/or other digital content transmitted to client computing device(s) in one or more of the downstream interactions can be tailored such that computational resource usage by the client computing device(s) is mitigated and/or such that cognitive burden on user(s) of the client computing device(s) is minimized. As one non-limiting example, a downstream prompt can be transmitted to a given client computing device and can include a plurality of selectable graphical elements that are each directed toward a multimedia subject that is chosen based on upstream interaction(s) with other client computing device(s). In this manner, a given user of the given client computing device may not need to utilize the given client computing device to perform computational resource intensive searching for and/or browsing of various multimedia subjects based on prior upstream interaction(s). Rather, the downstream prompt can already include graphical elements that are directed toward particular multimedia subject(s) chosen based on upstream interactions. Moreover, cognitive burden on the given user can be eased, through the display and/or other presentation of such particular multimedia subject(s).

The online game of various implementations disclosed herein includes a series of rounds, with each round including a matchup of two or more players from a group of players. For each round, one of the players selects a song title, and both of the players select videos of performances of that song by different artists. The two videos are provided to the other members of the group. The other members judge the videos and a score is determined for the players for the round. For each subsequent round, two other members of the group are paired, and the other members of the group act as judges for the round.

As an example, a group may include five members and a series of rounds may be determined, with each round including one player designated as the "home" player and a second player designated as a "visitor" player, and the other three members designated as "judges." The home player may be provided with a prompt to either select a song title or to defer selection to the visitor player. If the home player selects a song title, the visitor player then selects a video of a performance of the song, and then the home player selects a second video version of the song. The other three judges vote to determine a winner. If the home player instead defers, the visitor player selects a song title, the home player selects a video version of the song, and then the visitor player selects a second video version of the song. Subsequent rounds may include matchups between other members of the group and may continue until, for example, all members have been paired at least once with each other. An overall winner may be selected based on the scores from each round. In some implementations, one or more final rounds may be included after a series of initial rounds, such as a series of playoff or championship rounds that include the highest scoring players from previous rounds.

The home player and visitor player may have restrictions on the videos that may be selected for each round. For example, video selections may be limited to videos that do not include the original version of the selected song and/or to videos by performers other than the original performer of the song. Also, for example, a player may be restricted from selecting a video that includes the most popular or highest charted version of a song. In various implementations, the player(s) can be restricted from selecting video(s) via prompts and/or other digital content transmitted to client computing device(s) of the player(s). For example, the prompt(s) can include only selectable graphical interface elements for videos that meet one or more criteria (e.g., that are not the original version and/or that are by a performer that is not the original performer) and/or the digital content can prevent selection of certain videos. In this manner, computational resource intensive interactions via the client computing device(s) of the player(s) can be mitigated, through prevention of user selection of and/or searching for video(s) that fail to meet one or more criteria. Moreover, cognitive burden on the player(s) can be eased.

Judges may score a round by selecting one of the two videos from the round as the preferred video. In some implementations, judges may assign a rating to each of the videos. For example, a judge may score each of the videos on a scale of 1 to 10 in addition to or instead of selecting a preferred video. In some implementations, judges may submit commentary along with ratings. For example, a judge may be prompted to provide a commentary describing why the judge preferred one of videos. In some implementations, judges and/or players may be penalized for late submissions of videos and/or ratings. For example, a player may be forced to forfeit a round if the player does not provide a song title and/or video selection within a time period. Also, for example, a judge's rating may not be used and/or a judge may incur an additional penalty for not submitting a rating for a round within a time limit.

In some implementations, a computer implemented method is provided that includes the steps of: identifying a group, the group including a plurality of players; determining one or more matchups, wherein each matchup includes two of the players; and for each matchup: designating one player as a home player and the other as a visitor player; providing the home player with a prompt to provide a multimedia subject; receiving, in response to the prompt, one of the multimedia subject and a deferral to the visitor player; receiving a first media selection from the home player, the first media selection having the multimedia subject; receiving a second media selection from the visitor player, the second media selection having the multimedia subject; providing indications of the first media selection and the second media selection to the players of the group that are not the home player and the visitor player; receiving ratings of the first media selection and the second media selection by the players of the group; and determining a winner of each matchup, wherein the winner is one of the home player and the visitor player, and wherein the winner is determined based on the ratings.

This method and other implementations of technology disclosed herein may each optionally include one or more of the following features.

The method may further include the step of determining an overall score each of the players of the group based on the winner of each matchup.

For at least one matchup, the method may further include: providing the visitor player with a second prompt, the second prompt including an indication of the multimedia subject, and wherein the second media selection of the visitor player is received in response to the second prompt.

The method may further include, for each matchup: determining a composer of the first media selection; determining a validity of the first media selection based on the multimedia subject; and providing an error prompt to the home player if the validity of the first media selection is indicative of the first media selection being invalid. In some of those implementations, the multimedia subject may include an original composer of the multimedia subject, and validity of the first media selection may be determined based on the original composer of the multimedia subject. In some of those versions, the first media selection may be invalid if the composer of the first media selection is the same as the original composer.

The method may further include, for each matchup: determining one or more invalid versions of the multimedia subject; and providing an error prompt to the home player if the first media selection is one of the invalid versions. Invalid versions may be one of: an original version of the multimedia subject and a most-popular version of the multimedia subject.

In some implementations, a computer implemented method is provided and includes the steps of: determining a matchup of a first player and a second player of a group of players; identifying a multimedia subject; providing the second player with an indication of the multimedia subject; receiving a first player media selection from the first player, wherein the first player media selection is an indication of a multimedia file containing a third-party rendition of the multimedia subject by a first creator; receiving, in response to providing the indication, a second player media selection from the second player, wherein the second player media selection is an indication of a multimedia file containing a second third-party rendition of the multimedia subject by a second creator; providing indications of the first player media selection and the second player media selection to one or more judges, the one or more judges including players of the group of players that are not the first player and are not the second player; receiving, in response to providing the indications to the judges, ratings of the first player media selection and the second player media selection by each of one or more players of the group of players that are not the first player and are not the second player; and determining a winner of the matchup based on the ratings.

This method and other implementations of technology disclosed herein may each optionally include one or more of the following features.

Identifying the multimedia subject may include: prompting the first player to select the multimedia subject; and receiving the multimedia subject from the first player in response to the prompting of the first player.

Identifying the multimedia subject may include: prompting the first player to select the multimedia subject; receiving, in response to the prompting, a deferral from the first player; prompting the second player to select the multimedia subject; and receiving, in response to the prompting, the multimedia subject from the second player.

The first player media selection and the second player media selection may be music videos. In some of those implementations, the multimedia subject may be a song title. In some of those versions, the first player media selection and the second player media selection may be cover versions of the multimedia subject. The song title may originate from a composer that is distinct from the first creator and the second creator.

The method may further include the steps of: determining a second matchup of a third player and the first player; identifying a second multimedia subject; receiving a third media selection from the third player, wherein the third media selection is an indication of a multimedia file containing a third-party rendition of the second multimedia subject; receiving, in response to providing the indication, a fourth media selection from the first player, wherein the fourth media selection is an indication of a multimedia file containing a second third-party rendition of the second multimedia subject; providing indications of the third media selection and the fourth media selection to one or more of the players of the group of players that are not the first player and are not the third player; receiving, in response to providing the indications to the players, second matchup ratings of the third media selection and the fourth media selection by each of the players of the group of players that are not the first player and are not the third player; and determining a winner of the second matchup, wherein the winner is one of the first player and the third player, and wherein the winner is determined based on the second matchup ratings. In some of those implementations, the method may further include determining overall standings of the first player, the second player, and the third player based on the winner of the matchup and the winner of the second matchup.

Each of the ratings may be a preference of the first selection or the second selection.

The method may further include the steps of: providing the second player with an option to select the multimedia subject; and receiving, in response to the providing of the option, a deferral to the first player to select the multimedia subject.

A given rating of a player of the players may include a written opinion of at least one of the first media selection and the second media selection.

The method may further include: receiving a request for extension of time from one of the players.

Determining the winner of the matchup may be based on ratings of the players that were received within a time limit.

In some implementations, a method is provided that includes: determining a matchup of at least a first player and a second player of a group of players; identifying one or more criteria for multimedia selection for the matchup; and receiving, via at least one communication network, a first player selection made by the first player via a first player computing device. The first player selection is an indication of one or more multimedia files that satisfy the one or more criteria for multimedia selection for the matchup. The method further includes: providing, via the communication network, a second player computing device of the second player with an indication of the one or more criteria for multimedia selection for the matchup; and receiving, via the communication network in response to providing the indication, a second player selection made by the second player via the second player computing device. The second player selection is an additional indication of one or more additional multimedia files that satisfy the one or more criteria for multimedia selection for the matchup. The method further includes providing indications of the first player selection and the second player selection to one or more judges. The one or more judges include players of the group of players that are not the first player and are not the second player. Providing the indications is via the communication network and includes providing the indications to corresponding computing devices of the players of the group of players that are not the first player and are not the second player. The method further includes: receiving, via the communications network in response to providing the indications to the judges, ratings of the first player selection and the second player selection by each of one or more players of the group of players that are not the first player and are not the second player; determining a winner of the matchup based on the ratings; and transmitting, via the communication network, a graphical interface that identifies the winner of the matchup, the graphical interface transmitted for presentation to one or more of the players of the group of players.

These and other implementations of the technology may include one or more of the following features.

In some implementations, identifying the one or more criteria for the multimedia selection for the matchup includes: transmitting a prompt to the first player computing device; and receiving, from the first player computing device in response to transmitting the prompt, the one or more criteria for the multimedia selection for the matchup. The one or more criteria for the multimedia selection for the matchup are based on user interface input generated through interaction of the first player with at least one user interface input device of the first player computing device. In some of those implementations, providing the second player computing device of the second player with an indication of the one or more criteria for multimedia selection for the matchup occurs in response to receiving the criteria for the multimedia selection for the matchup from the first player computing device in response to the prompt. In some versions of those implementations, receiving the first player selection made by the first player via the first player computing device occurs after receiving the second player selection made by the second player via the second player computing device. Further, in some versions of those implementations, the method further includes: transmitting a selection prompt to the first player computing device after receiving the second player selection made by the second player via the second player computing device—and receiving the first player selection made by the first player via the first player computing device is in response to interaction of the first player with the selection prompt. The method can further include generating the selection prompt based on: the second player selection and/or the one or more criteria for multimedia selection for the matchup. For example, generating the selection prompt based on both: the second player selection, and the one or more criteria for multimedia selection for the matchup can include: generating the prompt to include suggestions only for selections that are not the same as the second player selection, and that satisfy the one or more criteria for multimedia selection for the matchup.

In some implementations, identifying the one or more criteria for the multimedia selection for the matchup includes transmitting a prompt to the first player computing device. The prompt presents the first player with: a selection option that enables the user to define the one or more criteria for the multimedia selection for the matchup and causes the second player to first make a selection that satisfies the one or more criteria; and a deferral option that enables the second player to define the one or more criteria for the multimedia selection for the matchup and causes the first player to first make a selection that satisfies the one or more criteria. In some of those implementations, identifying the one or more criteria for the multimedia selection for the matchup further includes, in response to selection of the deferral option via the first player computing device: transmitting, to the second player computing device, a criteria prompt that prompts the second user to define the one or more criteria for the multimedia selection for the matchup; and receiving, in response to the criteria prompt, the one or more criteria for the multimedia selection for the matchup.

In some implementations, the first player selection is a first set list that defines a plurality of first songs and a sequence for the first songs, and the second player selection is a second set list that defines a plurality of second songs and a sequence for the second songs. In some of those implementations, the one or more criteria for the multimedia selection for the matchup include one or more of: at least one original artist criteria, and at least one temporal criteria. In some versions of those implementations, the one or more criteria for the multimedia selection for the matchup include the at least one temporal criteria, and the at least one temporal criteria defines at least one calendar year.

In some implementations, the first player selection is a first music video that is a cover version of a first song by an original artist, and the second player selection is a second music video that is a cover version of a second song by the original artist. In some of those implementations, the one or more criteria for the multimedia selection for the matchup include the original artist. In some versions of those implementations, identifying the one or more criteria comprises automatically identifying the original artist based on recent death of the original artist (e.g., as indicated by a recent news story). For example, the original artist may be automatically identified, and a new competition started, in response to one or more electronic resources indicating the death of the original artist.

In some implementations providing indications of the first player selection and the second player selection to the one or more judges includes: providing an indication of the first player selection to the second player and to the players of the group of players that are not the first player and are not the second player; and providing an indication of the second player selection to the first player and to the players of the group of players that are not the first player and are not the second player.

In some implementations, the method further includes: receiving, via the communication network, a third player selection made by a third player via a third player computing device. The third player selection is an indication of one or more multimedia files that satisfy the one or more criteria for multimedia selection for the matchup. In some of those implementations, the method further includes: providing indications of the third player selection to at least the first player and the second player; and receiving, in response to providing the indications of the third player selection, ratings of the third player selection by at least the first player and the second player. In those implementations, determining the winner of the matchup is further based on the ratings of the third player selection.

Other implementations may include at least one non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIG. 2 is an example list of rounds of play for a group of members.

DETAILED DESCRIPTION

Figure 1:
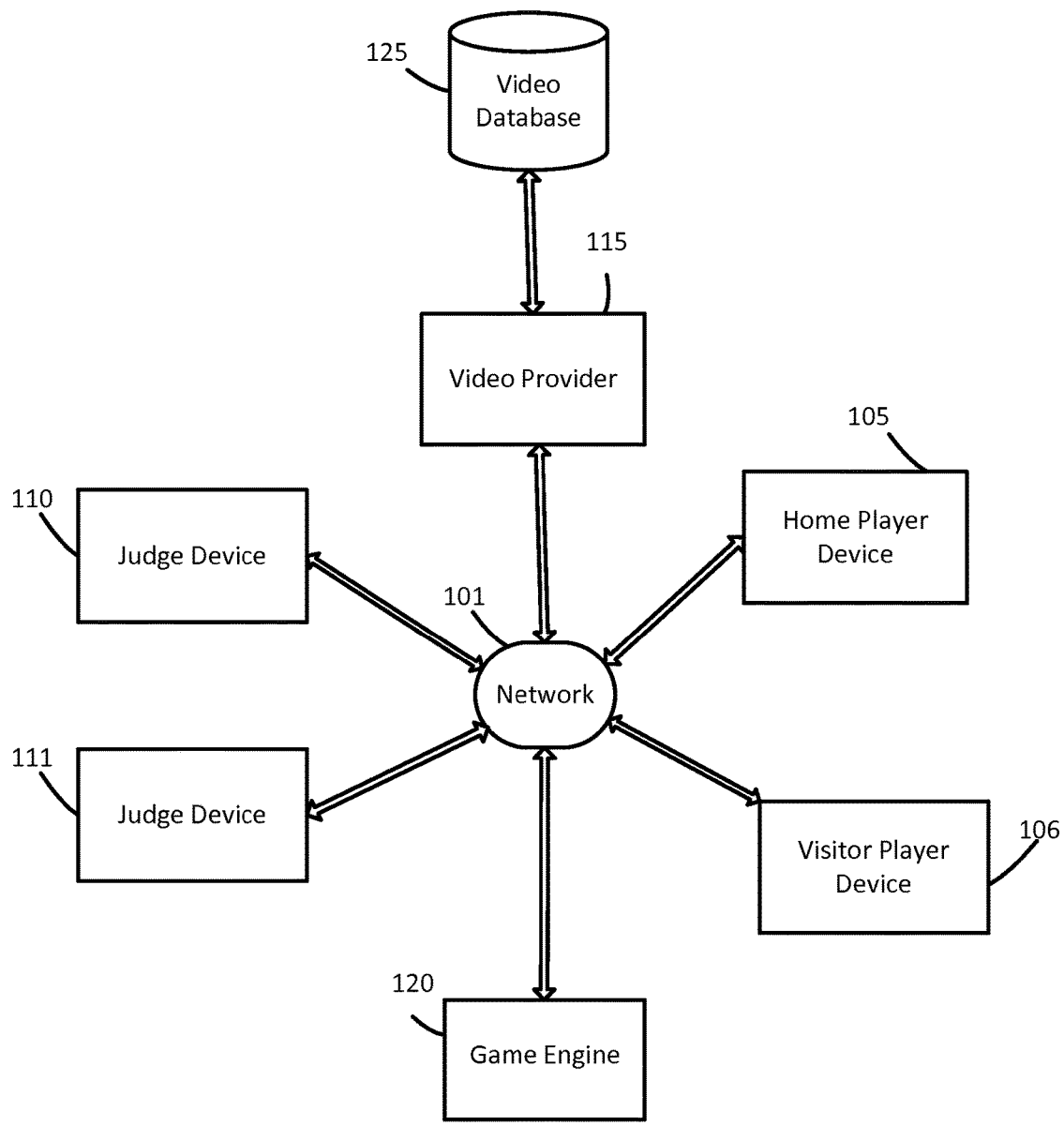
FIG. 1 is a block diagram of an example environment in which an online video sharing game may be implemented.

A group of users may have interest in sharing online multimedia related content, such as audio files or videos, and may have further interest in competing among the group to determine which users share more entertaining multimedia related content. For example, a user may provide a video to a group of other users and the other users may rate the video based on one or more characteristics, such as entertainment value, personal preferences, and/or talent of the performers of the video. In some implementations, the shared video may include music and/or performances by one or more actors and/or musicians. For example, a user may share a video that is a music video and that includes a live performance by musicians and/or a cinematic video accompanying the music. Music videos may include songs performed by the original artist of the song and/or a music video may include a cover version of a song (i.e., a version of a song performed by an act other than the original performer).

In some implementations, a group of players may be paired together through a series of rounds of head-to-head competitions to submit videos (and/or other multimedia related content, such as set lists), with one or more restrictions placed on video submissions by the others. In a round where two players are competing against each other, the other members of the group may vote on the preferred video selection of the two players' videos. For example, a round may include two users paired up as competitors, and both users may be required to submit cover versions of a particular song. The other members of the group may act as judges and vote, based on personal preference, which of the videos is preferred. Voting may include, for example, selecting one of the videos over the other video, writing comments regarding the submitted videos, and/or otherwise rating the videos to indicate the preferences of a judge for one of the videos.

In some implementations, one of the users competing in a round may be designated as the "home player" and a second user may be designated the "visitor player." The home player may be given an option to select a song or to pass song selection to the visitor player (i.e., "deferring" song selection). If the home player selects a song title, the visitor player selects a video of a performance of the selected song. In some implementations, one or more restrictions may be placed on video selection, such as restricting video selections to cover versions of the song. If the home player passes song selection to the visitor player, the visitor selects a song, the home player selects a video of that song first, and the visitor player selects a video last.

In some implementations, a group of three or more users are selected for a competition, and each of the users of the group acts as both a player and a judge for the competition.

For example, each of the users can be provided with a prompt to select multimedia related content that satisfies one or more criteria, and multimedia related content selections received for the users based on user interface inputs provided in response to the prompts. Further, each of the users can be provided with an indication of the multimedia related content selections of the other users, and asked to rank and/or provide other feedback on the multimedia related content selections of the other users. A performance metric for each of the users can then be determined based on the feedback provided by the other users.

As one example, prompts can be transmitted to client computing devices of Users 1-5. Each of the prompts can, for example, prompt a corresponding user to select a cover video for any one of a plurality of songs originally by a given original musician and/or originally of a given original album. In various implementations, each of the prompts can be configured to restrict selections to video(s) satisfying the criteria (e.g., originally by a given original musician and/or originally of a given original album). For example, the prompts can each include selectable elements only for video(s) that satisfy the criteria, can prevent selection of video(s) that fail to satisfy the criteria, and/or can restrict searching of video(s) to only videos that satisfy the criteria (e.g., through automatic setting of search filters). Moreover, in additional or alternative implementations, each of the prompts can be configured based on user interface input received in response to prior prompts provided to prior user client computing devices. For example, a subsequently transmitted prompt can be configured to exclude, or prevent selection of, video(s) selected via interaction(s) of prior user(s) in response to prior prompt(s). After Users 1-5 have each selected a corresponding cover video, a ranking or other judging interface can be presented to each of Users 1-5 (and/or optionally to additional users), where each interface enables the corresponding user to provide feedback related to the cover videos selected by other users. For example, a graphical user interface can be transmitted to a client device of User 1, that solicits User 1 to rank the cover videos selected by Users 2-4. Similarly, a graphical user interface can be transmitted to User 2, that solicits User 2 to rank the cover videos selected by User 1, User 3, and User 4. Similar transmissions to client devices of Users 3, 4, and 5 can be made, that each solicit the corresponding user to rank cover videos selected by other users. A winner can be selected based on the rankings, and digital content transmitted to one or more of the client devices of Users 1-5 to inform them of the winner.

As another example, prompts can be transmitted to client computing devices of Users 1-5. Each of the prompts can, for example, prompt a corresponding user to select a set list of multiple songs, that satisfy one or more criteria (e.g., the songs of the set list must all be originally by a given original musician, originally released during a given time period (e.g., "in 1983"), and/or of a particular genre). In various implementations, each of the prompts can be configured to restrict selections to songs satisfying the criteria. For example, the prompts can each include selectable elements only for songs that satisfy the criteria, can prevent selection of songs that fail to satisfy the criteria, and/or can restrict searching of songs to only those that satisfy the. Moreover, in additional or alternative implementations, each of the prompts can be configured based on user interface input received in response to prior prompts provided to prior user client computing devices. For example, a subsequently transmitted prompt can be configured to prevent selection of a set list that includes the same songs, in the same order, as a set list selected via interactions of a prior user in response to a prior prompt. After Users 1-5 have each selected a corresponding set list, a ranking or other judging interface can be presented to each of Users 1-5 (and/or optionally additional users), where each interface enables the corresponding user to provide feedback related to the set list selected by other users. A winner can be selected based on the feedback, and digital content transmitted to one or more of the client devices of Users 1-5 to inform them of the winner.

Referring to FIG. 1, a block diagram is provided of an example environment in which an interface may be provided to users to compete in a video-submission game. The environment includes home player device 105, visitor player device 106, judge devices 110 and 111, a video provider 115 in communication with a video database 125, and a game engine 120. The environment also includes a communication network 101 that enables communication between various components of the environment. In some implementations, the communication network 101 may include the Internet, one or more intranets, and/or one or more bus subsystems. The communication network 101 may optionally utilize one or more standard communications technologies, protocols, and/or inter-process communication techniques. In some implementations, one or more components may not be present and/or one or more additional components may be present.

Home player device 105, visitor player device 106, judge devices 110 and 111, game engine 120, and video provider 115 each include one or more memories for storage of data and software applications, one or more processors for accessing data and executing applications, and other components that facilitate communication over a network. The operations performed by video provider 115 and/or game engine 120 may be distributed across multiple computer systems. As used herein, for ease of readability, home player device 105, visitor player device 106, judge device 110, and judge device 111 may be collectively referred to as "player devices." Each member of a group of players may be associated with a device (or two or more players may share a device, with each member utilizing the device separately) such that the total number of devices is the same as the number of members. For example, a group may include five players and each round may include three judges, each with a judge device, one home player device, and one visitor player device. For subsequent rounds, the roles of the player devices may rotate. For example, in a later round of player, one of the judge devices may be designated home player device 105 and one of the judge devices may be designated visitor device 106, as described herein. Although FIG. 1 illustrates two judge devices, any number of devices may be included. For example, in a game played by a group of ten players, eight devices could be designated judge devices, one could be designated a home player device, and one could be designated a visitor player device.

A group of users may provide information to game engine 120 to create a group of players. For example, a plurality of users may access a webpage via computing devices and provide information to register in a group. A group may register to play a "season," the season including a number of rounds. For each round, game engine 120 may determine a matchup of two players of the group, designating one of the players as the home player and one of the players as the visitor player. Game engine 120 may determine a number of matchups for a group so that each player of the group plays each of the other players of the group at least once and/or that each player of the group plays each of the other players twice, once as home player and once as visitor player. Other techniques for matching up players to create a season may be utilized. For example, rounds may include more than two players competing and/or one or more matchups may be determined based on a bracketing system, such as a series of single elimination championship rounds and/or other tournament-style matchup system.

Referring to FIG. 2, an example of a series of rounds, or a "season," is provided. For each round, one of the players of a group comprising "Alice," "Bob," and "Chris" is designated the home player, and a second of the players of the group is designated the visitor player. For example, in the first round, "Alice" is designated the home player and "Bob" is designated the visitor player. Additionally, in the first round, "Chris" is a designated judge. In some implementations where a group of players includes more than 3 players, all players that are not designated as the home player or the visitor player for a round may be designated a judge for that round. For example, if the illustrated group also included "David," then David would additionally be a judge for any rounds where he is not designated the home player or the visitor player. In some implementations, game engine 120 may determine matchups between players in an alternative fashion. For example, matchups may be determined utilizing a bracket-based approach, utilizing one or more characteristics of the players (e.g., matching players with similar rankings), and/or one or more other schemes that results in a series of rounds of play.

In a round of play, game engine 120 may prompt one or more players to provide a multimedia subject. For example, game engine 120 may prompt the first player to provide a multimedia subject. The prompting may be via home player device 105 and may be provided through, for example, an email provided to the player, a message posted to one or more webpages that are accessible to the home player, and/or via an application executing on home player device 105. A multimedia subject may include, for example, a song title, a movie title, a television title, and/or one or more subjects that is associated with audio/visual performances. Throughout this specification, "song title" will be used as an example multimedia subject. In some implementations, the home player provides a song title to game engine 120. Game engine 120 may provide the selected song title to one or more of the other players of the group. For example, the home player may select a song title, provide the song title to the game engine 120, and the game engine may provide the selected song title to the visitor player.

In some implementations, a multimedia subject may include one or more artists, composers, and/or other identifying information to differentiate one multimedia subject from one or more similar multimedia subjects. For example, a song title may be associated with the original composer of the song, one or more particular versions of the song, and/or other information that may differentiate the song from other versions of the song. In some implementations, additional information included with the multimedia subject may be utilized to determine the validity of a selection of media by one or more of the players. For example, a multimedia subject may include a song title and the original artist that performed the song; and one or more components may determine whether selections by the players are associated with the same song title and a different artist than the original artist (i.e., a cover version).

In some implementations, an entity other than the players of the matchup may select a multimedia subject and provide the multimedia subject to one or more of the players. For example, one or more components may select a multimedia subject and provide the first player with the multimedia subject. Also, for example, a player that is a member of the group but that is not a member of the current matchup may select a multimedia subject and provide the subject to the home player and the visitor player.

Figure 3A:
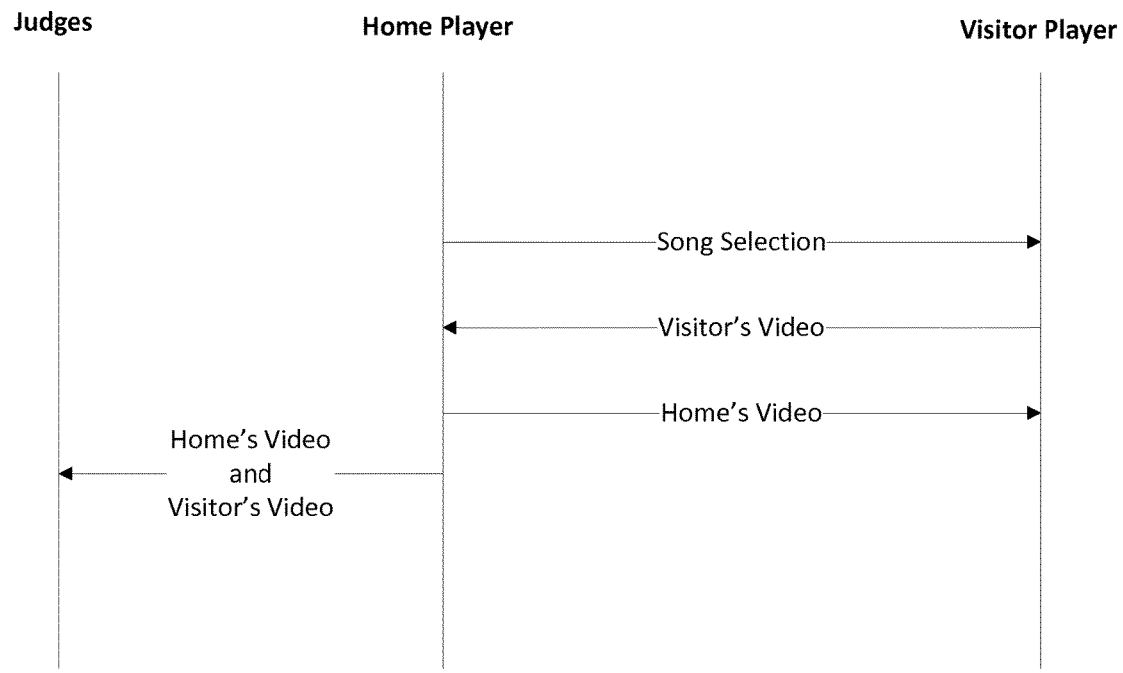
FIG. 3A is a diagram of an example of information transfer in a round of play where the home player selects a song title.

Referring to FIG. 3A, a diagram of an example of information transfer in a round of play is provided. Each of the vertical lines represents one or more players of a round (i.e., the home player, the visitor player, and the judge(s)). Each of the arrowed horizontal lines represents information that is transferred between the players. For example, the first line, "song selection," indicates that the home player has selected a song for the round and an indication of the song is provided to the visitor player. An indication of a "song selection" may include, for example, the name of the song, information related to the song, and/or a reference to a version of the song. The home player may provide the song title to game engine 120, and game engine 120 may subsequently provide the song title to the visitor player. For example, the home player may provide game engine 120 with a song selection via interaction with one or more applications executing on home player device 105. For instance, the home player device 105 may transmit a song selection to the game engine 120 in response to a selection and/or other interaction(s) of the user, via an application, to select the song. In some implementations, the home player may directly provide the song title to the visitor player. For example, the home player may send an email to the visitor player that includes the song title.

Figure 3B:
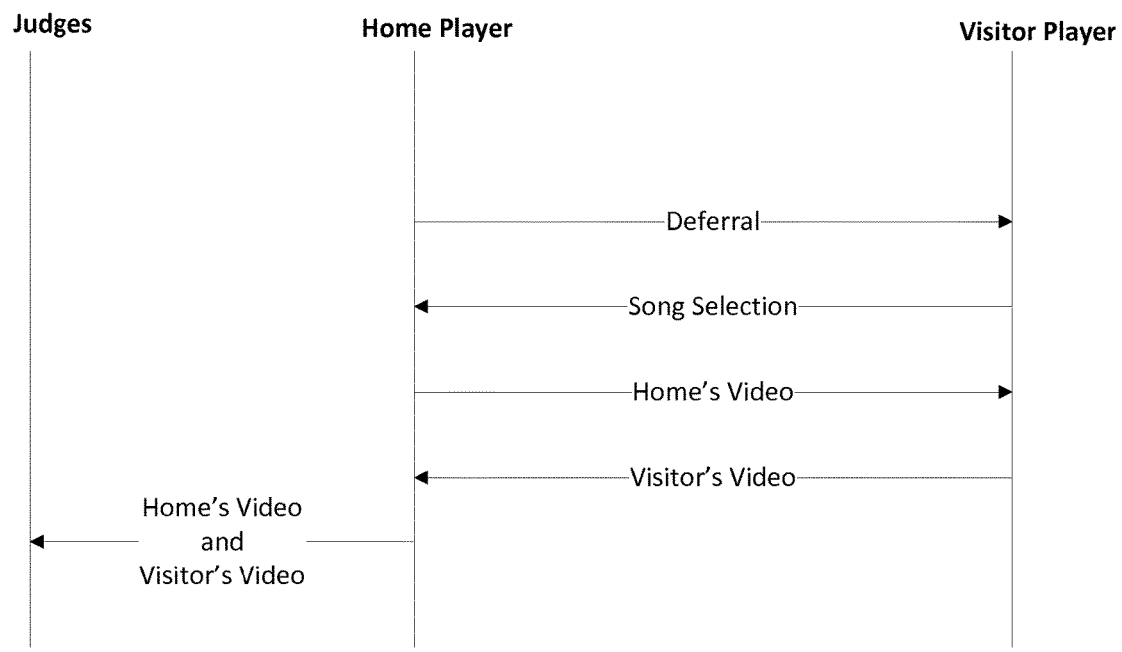
FIG. 3B is a diagram of an example of information transfer in a round of play where the home player defers selecting a song title.

In some implementations, the home player may elect to pass selection of a multimedia subject to the visitor player. For example, instead of selecting a song, the home player may respond to the game engine 120 with an indication that the visitor player is to select a song title first. Game engine 120 may provide the visitor player with a prompt to select a song title first in response to the home player responding with the indication that the visitor player is to select the song title first. For example, referring to FIG. 3B, a diagram of a second example of information transfer in a round of play is provided. In this example, the home player sends an indication of "deferral," the first arrowed horizontal line. The indication may be provided to game engine 120 and/or directly to the visitor player. The visitor player then selects a multimedia subject (e.g., a song title) and provides an indication of the selection to game engine 120, which then may provide the song title to the home player. Additionally or alternatively, the visitor player may directly provide the song selection to the home player, such as via email.

Figure 4:
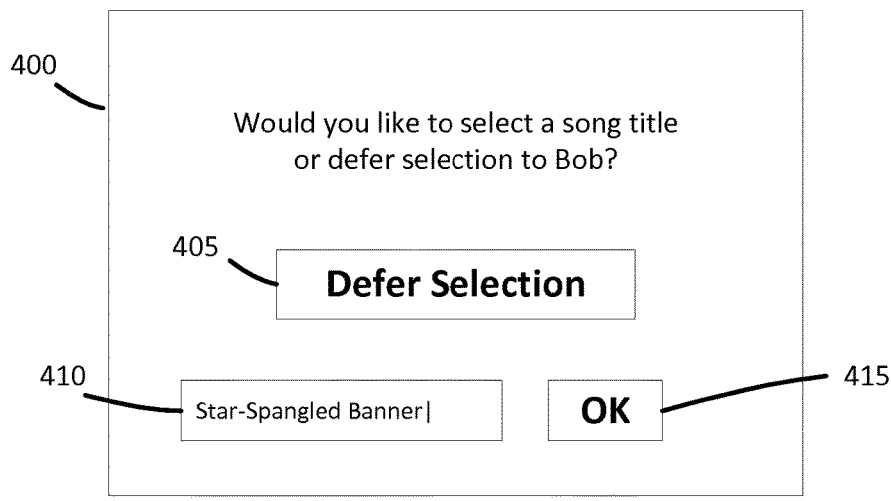
FIG. 4 is an example notification that may be provided to a home player at the beginning of a round.

Referring to FIG. 4, an example notification that may be provided to a home player is provided. The notification 400 includes a defer button 405. When provided with the notification 400, the home player may select the defer button 405 and an indication may be provided to the visitor player via visitor player device 106 to select a song title for the round, as indicated by the "deferral" arrow of FIG. 3B. In some implementations, the home player may select a song and input the name of the song in song text field 410. For example, notification 400 includes a selection of the song "The Star-Spangled Banner" provided by the home player in song text field 410. The home player may then select the OK button 415 to provide game engine 120 and/or visitor player device 106 with the song selection, "The Star-Spangled Banner." In some implementations, the home player may select additional information to provide to the visitor player and/or the game engine 120. For example, the home player may provide the visitor player and/or the game engine 120 with a link to a webpage that includes information related to the song, such as the author of the song, the original performer of the song, lyrics to the song, and/or information related to one or more performers of the song.

In some implementations where the home player selects the song title, the visitor player selects a video of a performance of the song selected by the home player. For example, the home player may be provided with a prompt to select a song and the home player may choose "The Star Spangled Banner" and provide game engine 120 with an indication of the song via home player device 105. Game engine 120 may provide the song title to visitor player 106 via visitor player device 106 and visitor player 106 may select a video of a performance of the song "The Star Spangled Banner," such as a video of "Jimi Hendrix" performing "The Star Spangled Banner."

Visitor player may identify a music video via video provider 115. In some implementations, video provider 115 may be a web-based service that provides access to a searchable database of videos. For example, video provider 115 may allow users access to videos stored in video database 125. In some implementations, player devices may access video provider 115 via one or more web interfaces. For example, a player may access video provider via a webpage, and the player may search and/or select one or more videos stored in video database 125 via the webpage. In some implementations, players may select one or more videos from alternative and/or additional sources. For example, a video may be selected that is stored locally on home player device 105 and/or player device 106. In some implementations, video provider 115 may be utilized by game engine 120 to provide indications of one or more videos to players. For example, game engine 120 may utilize video provider 115 to provide still images, short clips, and/or other information related to one or more videos to players. For instance, the game engine 120 can interface (e.g., via an application programming interface) with the video provider 115 to cause the video provider 115 to search for videos that are of the selected song, and the game engine 120 can provide information that is related to the videos identified by the video provider.

Figure 5:
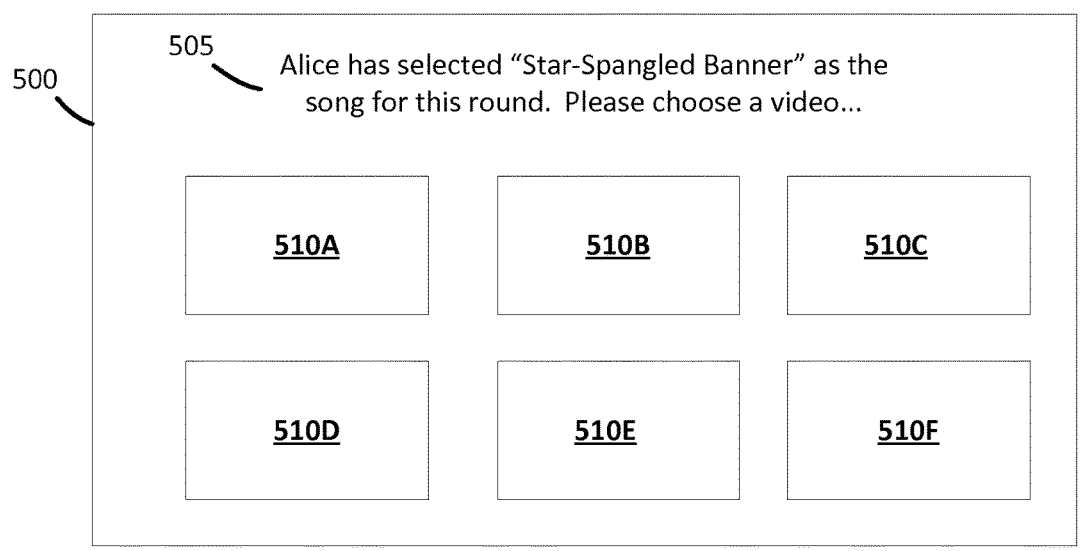
FIG. 5 is an example interface that may be provided to a player to prompt the player to select a music video in response to the other player selecting a song title.

Referring to FIG. 5, an example interface for a player to select a music video is provided. In some implementations, the video selection interface 500 may be provided to the home player and/or to the visitor player. The interface 500 includes a song selection message 505 to inform the player of the song selection of the other player. For example, the home player may select "The Star-Spangled Banner" as the song selection for a round, as illustrated in FIG. 4, and the visitor player may be provided with interface 500 with song selection message 505 indicating the selected song for the round. Also, for example, the home player may defer song selection to the visitor player, the visitor player may select a song for the round, and the home player may be provided with interface 500 with song selection message 505 indicating the song that was selected by the visitor player.

In some implementations, video selection interface 500 may include one or more video suggestions 510A through 510F. For example, video suggestions 510A through 510F may display screen captures, short clips, and/or other identifying information for one or more potential videos to be selected by the player. In some implementations, one or more of the video suggestions 510A through 510F may be provided by video provider 115. For example, the home player may select "Star-Spangled Banner" as a song selection, video provider 115 may identify one or more videos of versions of "Star-Spangled Banner," and the visitor player may be provided video selection interface 500 with video suggestions 510A through 510F displaying short clips of the videos identified by video provider 115. In this manner, the video suggestions 510A through 510F can be tailored to include only video versions of "Star-Spangled Banner" and/or can be tailored to exclude previously selected video versions of that song (if any). In some implementations, video selection interface 500 may be provided without suggestions of video selections. For example, the home player may select a song for a round and the visitor may be provided with only the song selection. The visitor player may then identify a video selection via one or more online interfaces, such as a webpage provided by video provider 115, and the visitor player may provide an indication of a selected video, such as a link to a webpage that includes the selected video.

In some implementations, one or more restrictions may be placed on video selections. For example, in some implementations, a video selection may be restricted to videos of non-original versions of a song. As an example, the home player of a round may select "Let It Be" as a song selection. The visitor player may then select a video of a version of "Let It Be," but may not be permitted to select the original Beatles version of the song. For example, one or more graphical interfaces provided by the game engine 120 for presentation to the visitor player may exclude any selectable elements for the original Beatles version and/or may be configured to present an error message in response to selection of the original Beatles version. Also, for example, the visitor may be restricted from selecting versions performed by one or more members of the Beatles. Also, for example, the visitor may be restricted from selecting versions of "Let It Be" that reached a particular level of popularity. For example, the visitor player may be restricted from selecting videos of versions of "Let It Be" that have appeared on a Top 40 list and/or that have sold more than a certain number of copies. In some implementations, video selections may be restricted based on one or more other criteria, such as restrictions to non-live versions of songs (e.g., a studio-recorded version and not a concert version). Also, for example, video selections may be limited to amateur versions of songs and/or to videos that include non-professional audio and/or video.

Figure 6:
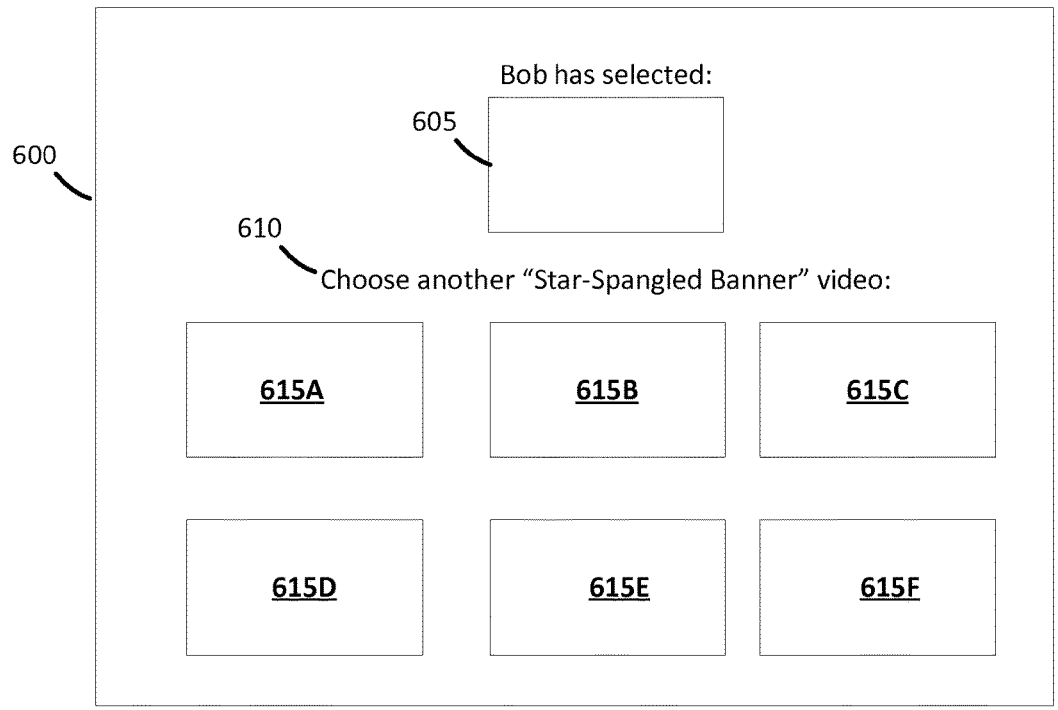
FIG. 6 is an example interface that may be provided to a player to prompt the player to select a music video in response to the other player selecting a music video.

Referring to FIG. 6, an example of an interface to prompt a player to select a video in response to the other player of the round selecting a video is provided. The interface 600 includes a selected video indication 605, a message 610, and video suggestions 615A through 615F. In some implementations, interface 600 may be provided to the home player via home player device 105 when the home player selects a song title. The interface 600 may be provided to home player after the visitor player has selected a video, such as after the visitor player has been provided an interface that shares one or more characteristics with interface 500. Also, for example, visitor player may be provided interface 600 via visitor player device 106 when the home player has deferred song title selection to the visitor player, and after the home player has selected a video. Selected video indication 605 may provide the player with an indication of the video selected by his opponent (i.e., the video selected by the home player when interface 600 is provided to the visitor player, or vice versa). For example, the home player may select a Jimi Hendrix "Star-Spangled Banner" video and interface 600 may be provided to the visitor player with a short clip of the selected video at selected video indication 605. In some implementations, selected video indication 605 may not be included and the title and/or artist of the selected video may be provided as a message 610. In some implementations, video suggestions 615A through 615F may include indications of potential videos that may be selected by the player. Video suggestions 615A through 615F may be provided by video provider 115 and may include videos of performances of the selected song title that meet one or more other criterion (e.g., cover versions of the song). In some implementations, the game engine 120 tailors the interface 600 to exclude, from suggestions 615A through 615F, any suggestions that fail to satisfy one or more criteria and/or to present an error message in response to selection of a suggestion that fails to satisfy one or more criteria. For example, suggestions that are by an "original" artist may be excluded, as well as suggestion(s) that are by the same artist as the video selected by an opponent (as indicated in video indication 605).

In some implementations, the player may select one of the video suggestions 615A through 615F and/or may otherwise indicate a video as a selection for the round. For example, the player may select a video of "Roseanne Barr" singing the "Star-Spangled Banner" as his video selection for the round by selecting the video from the video suggestions 615A through 615F and/or by otherwise indicating the video, such as by providing a link to a webpage that includes the video. Once the player has selected a video, both players' videos may be provided to the other members of the group. For example, referring again to FIG. 3A, the home player may select a song, the visitor player may select a video, the home player may select a video, and then indications of both videos may be provided to the other players of the group who are judges for the round. Also, for example, referring again to FIG. 3B, the home player may defer to the visitor player, the visitor player may select a song, the home player may select a video, the visitor player may select a video, and then both videos may be provided to the other players for judging.

Figure 7:
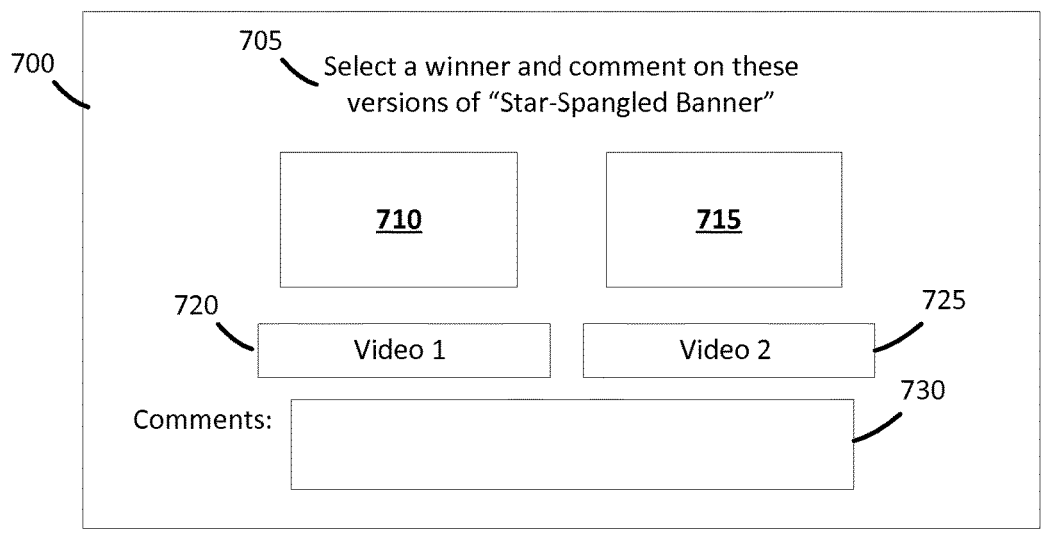
FIG. 7 is an example interface that may be provided to a judge to prompt the judge to rate and comment on the video selections of the round.

Referring to FIG. 7, an example interface is illustrated that may be provided to players of a group to judge the videos of a round of play. The interface 700 includes a message 705, the home player video indication 710, the visitor player video indication 715, home player voting button 720, visitor player voting button 725, and a comments box 730. In some implementations, interface 700 may be provided to the judges via judge devices 110 and 111. For example, in a group with five members, three of the members may be provided interface 700 via judge devices. In some implementations, one or more features of interface 700 may not be present. For example, in some implementations, interface 700 may not include comments box 730, and the judges may only have an option to select one of the two videos.

In some implementations, the judges may view the home player's video via home player video indication 710. For example, home player video indication 710 may be a viewing frame and video provider 115 access video database 125 and provide the video to the judge in home player video indication 710. In some implementations, a judge may select home player video indication 710 and be directed to a webpage that includes the video. For example, a judge may select home player video indication 710 via a browser executing on judge device 110 and the browser may be directed to a webpage provided by video provider 115 that includes the home player video selection. The judge may then view the video. Similarly, visitor player video selection indication 715 may be a frame that provides the visitor player video selection to the judge and/or a judge may select visitor player video selection indication 715 and be directed to a webpage that includes the visitor player video.

In some implementations, judges may provide written commentary via comments box 730. For example, in addition to selecting one of the videos as a preferred video by selecting home player voting button 720 or visitor player voting button 725, a judge may provide written commentary to indicate, for example, why he selected one of the videos over the other video, what he liked and/or disliked about the videos, and/or provide additional opinions related to the round of videos.

As an example, a judge may be provided with a home player video of Jimi Hendrix performing the "Star-Spangled Banner" and a visitor player video of Roseanne Barr performing the "Star-Spangled Banner." The judge may select the Roseanne Barr video as the winner, and further provide commentary of "I chose Roseanne because I think she is funny and a great singer." The judge's video choice and commentary may be provided to game engine 120, which may additionally receive the rest of the judges' choices and determine a winner for the round.

In some implementations, a winner of a round may be determined by game engine 120 based on the judge ratings for a round. For example, for a group of five players, "Alice" may have been designated home player and "Bob" may have been designated visitor player. After the judges "Chris," "Dave," and "Eric" are provided with the home player and visitor player videos, each of the judges may determine which of the videos is preferred. If Chris and Dave chose Alice and Eric chose Bob, then game engine 120 may determine that Alice is the winner of the round. In some implementations, a score may be determined for each player in a round. For example, in the preceding example, Alice may be given a score of two and Bob may be given a score of 1. In some implementations, the judges may score each of the videos, such as by providing a score from one to ten for each of the videos, and game engine 120 may utilize the scores to determine a winner for the round. For example, in the preceding example, Alice may receive scores of 2 from Chris, 5 from Dave, and 8 from Eric; and Bob may receive scores of 3 from Chris, 3 from Dave, and 3 from Eric; and game engine 120 may determine that Alice is the winner by summing each player's scores and determining the player with the highest score (i.e., 15 for Alice and 9 for Bob) and/or the highest average score (i.e., an average of 5 for Alice and an average of 3 for Bob). Commentary of judges may be provided to the players of the matchup, to all players of the group, and/or to one or more members outside of the group. For example, a group of players may play a series of rounds that are accessible to the public and judge commentary may or may not be accessible to one or more viewers of the round results.

Figure 8:
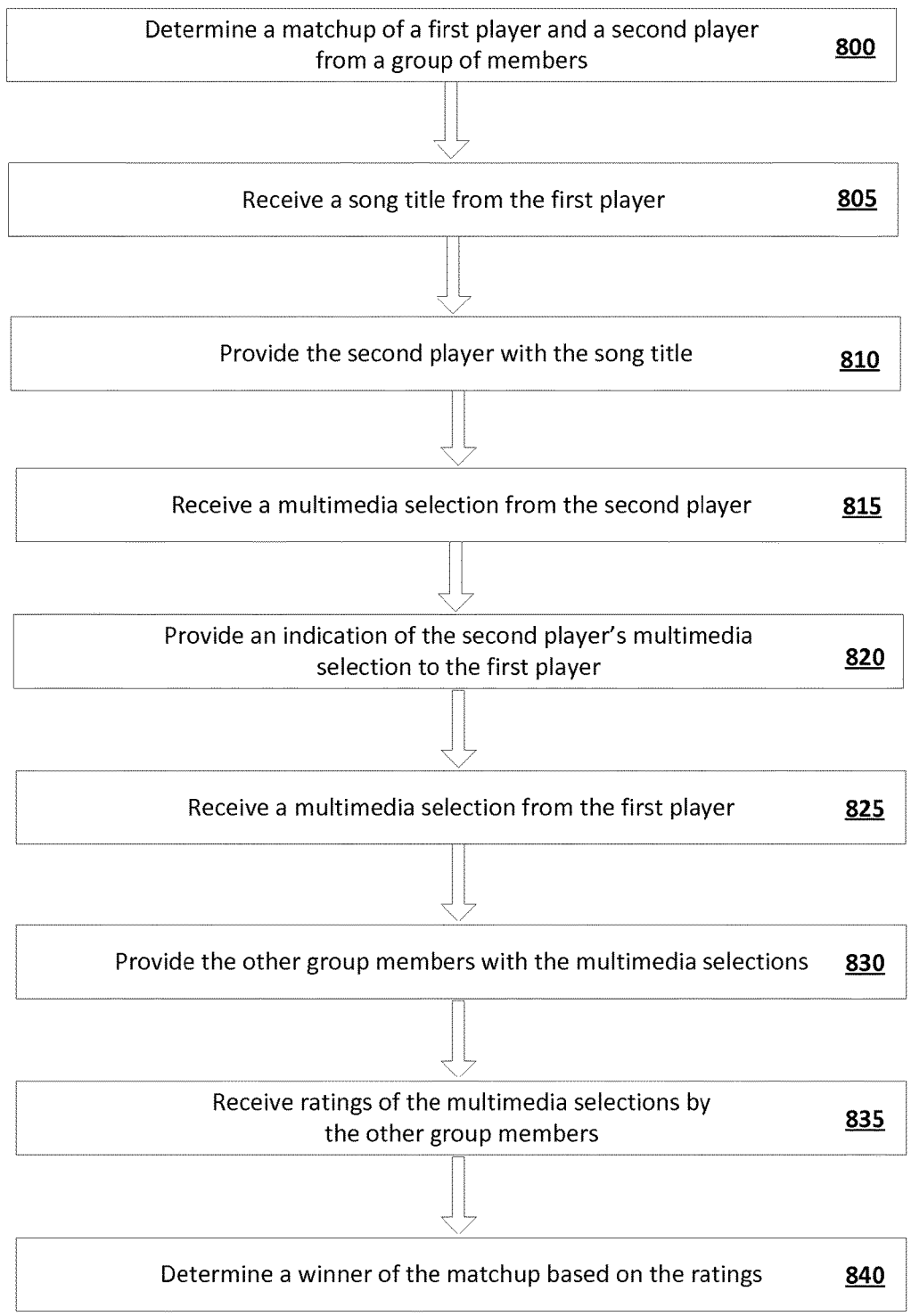
FIG. 8 is a flowchart of an example method for executing an online video submission game and determining a winner of a round of the online game.

Referring to FIG. 8, a flowchart of an example method for determining a winner of a round of an online game is provided. Other implementations may perform the steps in a different order, omit certain steps, and/or perform different and/or additional steps than those illustrated in FIG. 8. For convenience, aspects of FIG. 8 will be described with reference to one or more components of FIG. 1 that may perform the method, such as game engine 120.

At step 800, a matchup is determined between a first player, and a second player. In some implementations, the first player and second player may be identified from a group of players. For example, a group of five players may be identified and the first player and the second player may be selected from the group. In some implementations, the matchup of the first player and the second player may be determined by a component that shares one or more characteristics with game engine 120. In some implementations, the first player and the second player may be designated the "home" player and the "visitor" player.

At step 805, the first player provides a multimedia subject, such as a song title. In some implementations, step 805 includes receiving the multimedia subject at a remote computing device in response to selection of the multimedia subject at a client device of the first player. For example, the first player can select the multimedia subject at the client device and, in response to the selection, the client device can transmit (e.g., via a wide area network) an indication of the multimedia subject to the remote computing device. In some implementations, the first player may provide the song title in response to being provided with a prompt via a computing device, such as home player device 105 and/or visitor player device 106. In some implementations, the first player may provide the song title in response to receiving an indication that the second player has chosen to defer song selection. For example, in some implementations, the second player may be provided with an option to either select a song title or defer song selection to the first player, and the second player may elect to defer selection. The first player may provide a song title in response to receiving an indication of the second player's deferral. In some implementations, this step may be omitted and/or the multimedia subject may be provided by one or more other components and/or players. For example, game engine 120 may randomly select a song title, game engine 120 may identify a multimedia subject that is currently popular and/or trending, and/or one or more other players of the group may select a song title to provide to the first player and the second player.

At step 810, the second player is provided with an indication of the song that was selected by the first player. For example, the second player may be provided with an email and/or other indication of the name of the song that was selected by the first player. In some implementations, the second player may be provided with additional information related to the song, such as the original artist that performed the song, indications of popular versions of the song, and/or the artist that wrote the song. In some implementations, a remote computing device transmits the indication of the song to a client device of the second player. For example, the remote computing device can transmit a graphical interface, that includes the indication of the song, to the client device of the second player.

At step 815, a multimedia selection is received from the second player. In some implementations, step 815 includes receiving the multimedia selection at a remote computing device in response to selection of the multimedia selection at a client device of the second player. For example, the second player can select the multimedia selection at the client device and, in response to the selection, the client device can transmit (e.g., via a wide area network) an indication of the multimedia selection to the remote computing device. The multimedia selection may include, for example, a combination of audio and/or video. For example, a multimedia selection may include a publically-available online music video, and may include audio of a particular song and video of a performance of the song and/or a video provided with the audio. In some implementations, the multimedia selection of the second player is provided in response providing the second player with the song selection of the first player. For example, the first player may select "Crimson and Clover" as the song title for the round, and the second player may select a music video that is a performance of the song "Crimson and Clover." In some implementations, game engine 120 may determine whether the selected multimedia selection is an allowable selection and/or may otherwise restrict the multimedia selection to allowable selections (e.g., those that satisfy one or more criteria). For example, game engine 120 may identify one or more music videos that are not allowable, such as an original version of the song and/or one or more versions that achieved a determined level of success, and prompt the second player for a different selection if the initially selected version is not authorized.

At step 820, an indication of the second player's multimedia selection is provided to the first player. In some implementations, a remote computing device transmits the indication of the second player's multimedia selection to a client device of the first player. For example, the remote computing device can transmit a graphical interface, that includes an indication of the second player's multimedia selection, to the client device of the first player. In some implementations, the multimedia selection may be on online video and the indication may be a song title and artist, a link to a video, and/or other identifying information. In some implementations, the indication may be provided to the first player only when the selection is allowable, as described in step 815.

At step 825, a multimedia selection of the first player is received. In some implementations, step 825 may share one or more characteristics with step 815. In some implementations, game engine 120 may verify that the version of the multimedia subject selected by the first player is not the same as the selection of the second player and/or may otherwise restrict the multimedia selection to allowable selections (e.g., those that satisfy one or more criteria). For example, in addition to verifying that the selection is allowable, as described in step 815, game engine 120 may further verify that the creator of the first player's selection is different than the creator of the second player's selection.

At step 830, the selections of the first player and the second player are provided to one or more of the other players of the group. The selections may be provided via an interface that shares one or more characteristics with the interface provided in FIG. 7. In some implementations, all of the players of the group, excluding the players of the matchup, may be provided with indications of the selections. The indications may include, for example, links to the selections, an interface where the selections may be viewed (such as FIG. 7), and/or one or more other interfaces.

At step 835, ratings of the multimedia selections may be received from the players that were provided the selections at step 830. In some implementations, each of the ratings may include a selection of one of the player selections over the other player selection. For example, for each of the judging players that are provided the selections of the first player and the second player, the judging player may select either the first player's selection or the second player's selection as the preferred selection. In some implementations, judging players may additionally or optionally include a written opinion of either or both of the provided selections. For example, judging players may provide an explanation of why they selected a preferred selection. In some implementations, judging players may be limited to a time period to provide a selection. For example, judging players may be required to provide a preferred selection within 48 hours, and any late submissions may not be utilized to determine an overall winner of the round. In some implementations, a judging player and/or matched-up player may request extensions of time if the player determines that he will be unable to submit a selection and/or judge selections within the required time period.

At step 840, a winner of the matchup is determined based on the ratings of the judging players. For example, the judging players may each select one of the two selections as a preferred selection, and the winner may be determined based on which of the players' selections was chosen by more judges. Also, for example, the judges may rate each selection on a scale, such as giving each selection a rating between 1 and 10, and the winner of a matchup may be determined based on which of the selections has a higher average rating.

Figure 9:
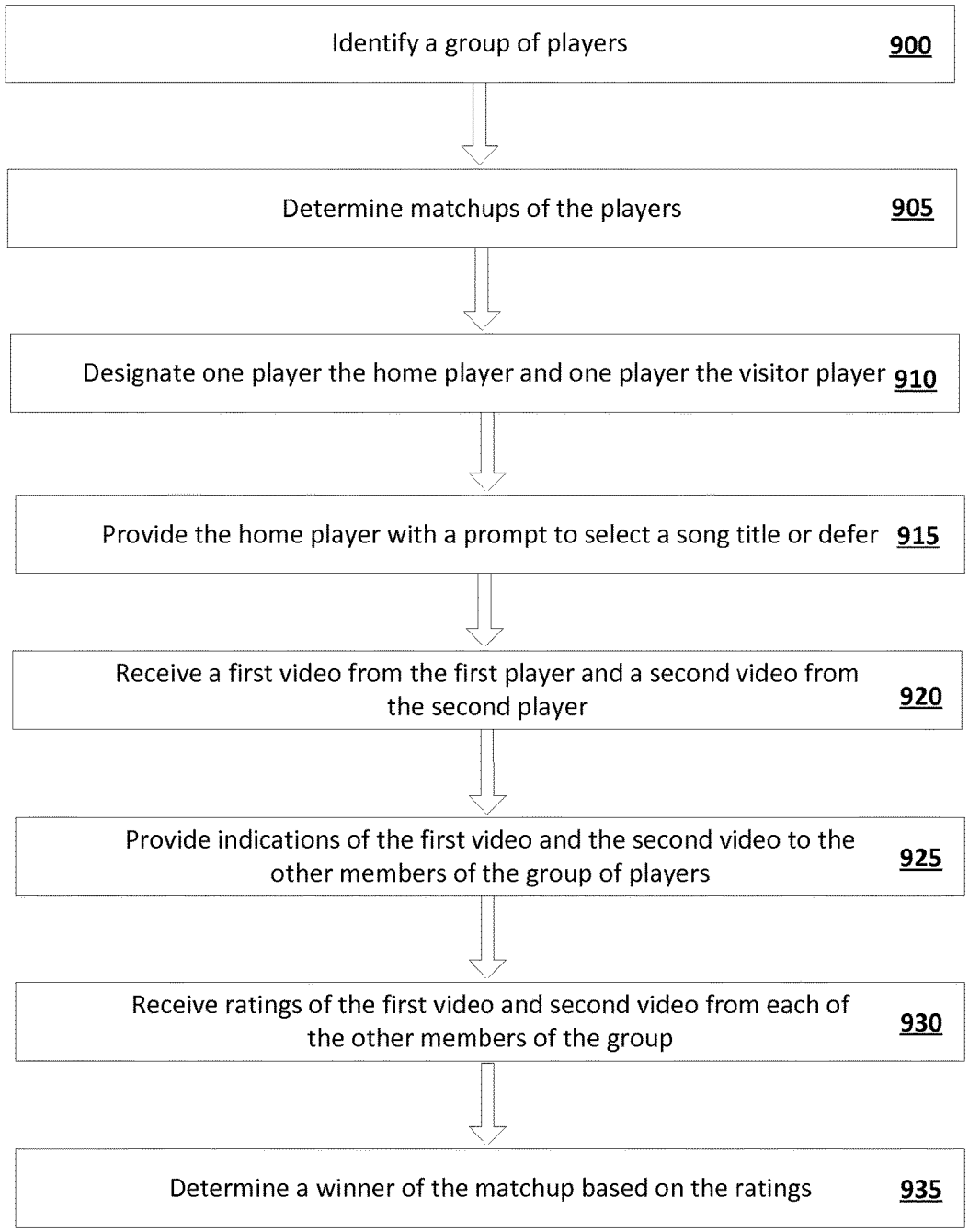
FIG. 9 is a flowchart of an example method for determining rounds of play for an online game and determining scores for each round.

Referring to FIG. 9, a flowchart of an example method for determining rounds of play for an online game and determining scores for each round is provided. Other implementations may perform the steps in a different order, omit certain steps, and/or perform different and/or additional steps than those illustrated in FIG. 9. For convenience, aspects of FIG. 9 will be described with reference to one or more components of FIG. 1 that may perform the method, such as game engine 120.

At step 900, a group of players is identified. Step 900 may share one or more characteristics with step 800 of FIG. 8. For example, a group of five players may be identified and the first player and the second player may be selected from the group.

At step 905, a deferral is received from the first player. In some implementations, the first player may be provided with an option to either select a multimedia subject, such as a song title, or defer the selection of a multimedia subject to the second player.

At step 910, a multimedia subject is received from the second player. In some implementations, step 910 may share one or more characteristics with step 805 of FIG. 8. For example, the second player may select a song title, a video title, and/or other indication of a subject of a multimedia file.

At step 915, either a multimedia selection or a deferral is received from the first player. In some implementations, the received multimedia selection may be an indication of media file that contains a third party rendition of the multimedia subject. For example, the first player may select "Star Spangled Banner" as a multimedia subject and the second player may select a multimedia file that contains an audiovisual rendition of an artist performing "The Star Spangled Banner." In some implementations, the first player may choose to defer selection of a multimedia subject to the second player. In implementations where the first player defers, a multimedia subject may be selected by the second player and the first player may select a multimedia file that contains an audiovisual rendition of an artist performing the multimedia subject (e.g., a music video of a version of a multimedia subject that is a song title).

At step 920, a multimedia selection is received from the second player. In some implementations, step 920 may share one or more characteristics with step 915. For example, the second play may provide an indication of a multimedia file that contains a third-party rendition of the multimedia subject. In some implementations, one or more restrictions may be placed on multimedia selections. For example, the first player and the second player may be prohibited from selection multimedia files that are performed by the original artist of the multimedia subject and/or by an artist that gained a threshold level of popularity for the multimedia subject (e.g., the artist that made a song popular, even if not the original artist). In some implementations, the second player may be prohibited from selecting a multimedia file that is by the same creator as the multimedia file that was selected by the first player. For example, if the first player selected "Knockin' On Heaven's Door" by Bob Dylan as a multimedia selection, the second player may be required to select a different artist's rendition and/or a different rendition by the same artist. In some instances, the first player may select the multimedia subject at step 915 and the second player may select a video first. In some instances, the first player may defer at step 915, the second player may select the song title, and the first player may select a version first at step 920.

At step 925, one or more of the other players of the group are provided the multimedia selections of the first player and the second player. In some implementations, step 925 may share one or more characteristics with step 830 of FIG. 8.

At step 930, ratings of the multimedia selections are received. The ratings may be received from the other players of the group that were provided the multimedia selections of the first player and the second player. In some implementations, step 930 may share one or more characteristics with step 835 of FIG. 8.

At step 935, a winner of the matchup is determined. The matchup may be determined by a component that shares one or more characteristics with game engine 120. In some implementations, step 935 may share one or more characteristics with step 840 of FIG. 8.

Figure 10:
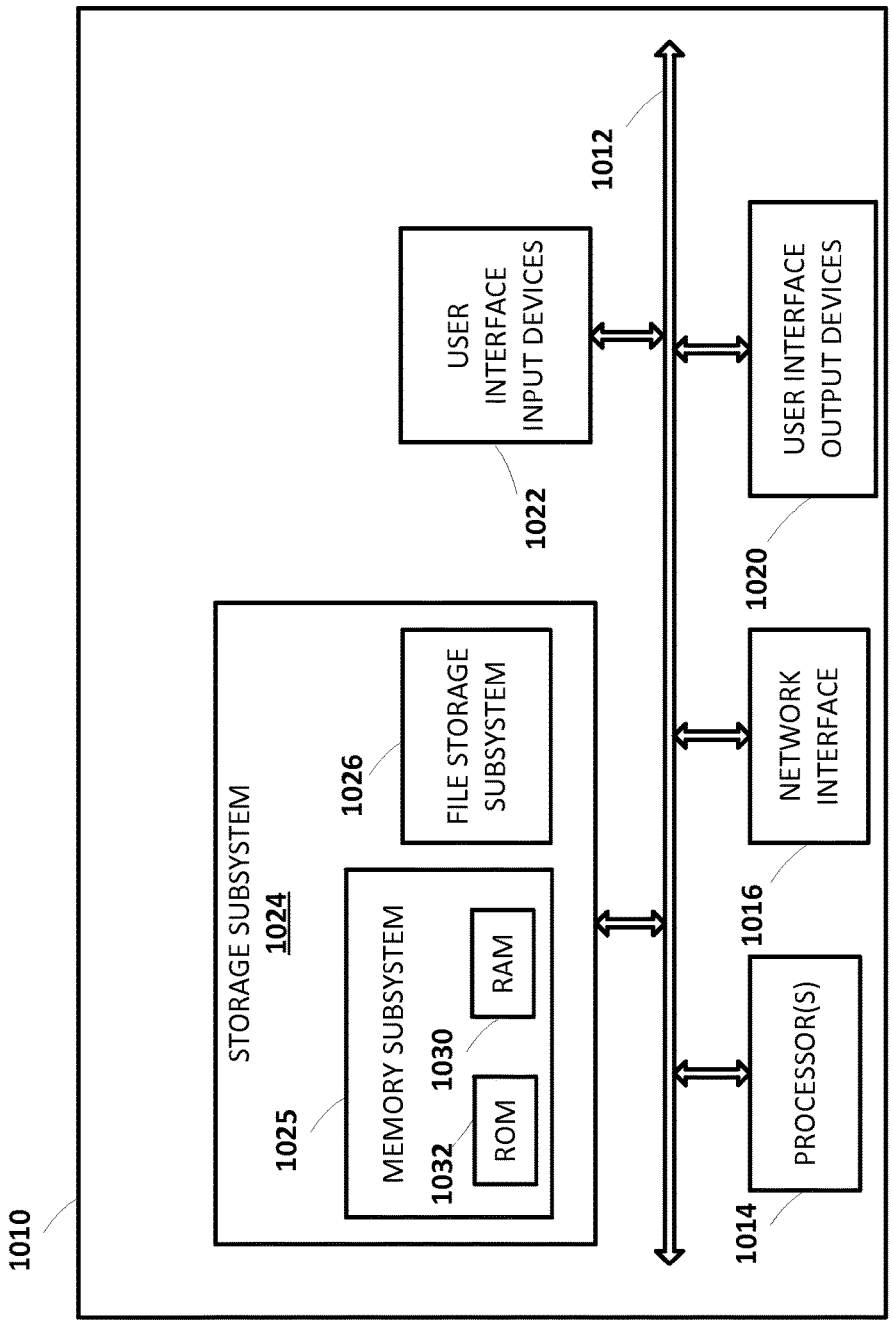
FIG. 10 illustrates a block diagram of an example computer system.

FIG. 10 is a block diagram of an example computer system 1010. Computer system 1010 typically includes at least one processor 1014 which communicates with a number of peripheral devices via bus subsystem 1012. These peripheral devices may include a storage subsystem 1024, including, for example, a memory subsystem 1026 and a file storage subsystem 1028, viewer interface input devices 1022, viewer interface output devices 1020, and a network interface subsystem 1016. The input and output devices allow viewer interaction with computer system 1010. Network interface subsystem 1016 provides an interface to outside networks and is coupled to corresponding interface devices in other computer systems.

Viewer interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1010 or onto a communication network. Viewer interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1010 to the viewer or to another machine or computer system.

Storage subsystem 1024 stores programming and data constructs that provide the functionality of some or all of the modules described herein. For example, the storage subsystem 1024 may include the logic to provide an interface to execute an online competition.

These software modules are generally executed by processor 1014 alone or in combination with other processors. Memory 1026 used in the storage subsystem 1024 can include a number of memories including a main random access memory (RAM) 1030 for storage of instructions and data during program execution and a read only memory (ROM) 1032 in which fixed instructions are stored. A file storage subsystem 1028 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1028 in the storage subsystem 1024, or in other machines accessible by the processor(s) 1014.

Bus subsystem 1012 provides a mechanism for letting the various components and subsystems of computer system 1010 communicate with each other as intended. Although bus subsystem 1012 is shown schematically as a single bus, alternative implementations of the bus subsystem may use multiple busses.

Computer system 1010 can be of varying types including a workstation, server, computing cluster, blade server, server farm, or any other data processing system or computing device. Due to the ever-changing nature of computers and networks, the description of computer system 1010 depicted in FIG. 10 is intended only as a specific example for purposes of illustrating some implementations. Many other configurations of computer system 1010 are possible having more or fewer components than the computer system depicted in FIG. 10.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A method implemented by one or more processors, comprising:
   determining a matchup of at least a first player and a second player of a group of players;
   identifying one or more criteria for multimedia selection for the matchup;
   receiving, via at least one communication network, a first player selection made by the first player via a first player computing device, wherein the first player selection is an indication of one or more multimedia files that satisfy the one or more criteria for multimedia selection for the matchup;

providing, via the communication network, a second
player computing device of the second player with an
indication of the one or more criteria for multimedia
selection for the matchup;
receiving, via the communication network in response to
providing the indication, a second player selection
made by the second player via the second player
computing device, wherein the second player selection
is an additional indication of one or more additional
multimedia files that satisfy the one or more criteria for
multimedia selection for the matchup;
providing indications of the first player selection and the
second player selection to one or more judges, the one
or more judges including players of the group of
players that are not the first player and are not the
second player, wherein providing the indications is via
the communication network and includes providing the
indications to corresponding computing devices of the
players of the group of players that are not the first
player and are not the second player;
receiving, via the communications network in response to
providing the indications to the judges, ratings of the
first player selection and the second player selection by
each of one or more players of the group of players that
are not the first player and are not the second player;
determining a winner of the matchup based on the ratings;
and
transmitting, via the communication network, a graphical
interface that identifies the winner of the matchup, the
graphical interface transmitted for presentation to one
or more of the players of the group of players.

2. The method of claim 1, wherein identifying the one or more criteria for the multimedia selection for the matchup includes:
transmitting a prompt to the first player computing device; and
receiving, from the first player computing device in response to transmitting the prompt, the one or more criteria for the multimedia selection for the matchup, wherein the one or more criteria for the multimedia selection for the matchup are based on user interface input generated through interaction of the first player with at least one user interface input device of the first player computing device.

3. The method of claim 2, wherein providing the second player computing device of the second player with an indication of the one or more criteria for multimedia selection for the matchup occurs in response to receiving the criteria for the multimedia selection for the matchup from the first player computing device in response to the prompt.

4. The method of claim 3, wherein receiving the first player selection made by the first player via the first player computing device occurs after receiving the second player selection made by the second player via the second player computing device.

5. The method of claim 4, further comprising:
transmitting a selection prompt to the first player computing device after receiving the second player selection made by the second player via the second player computing device;
wherein receiving the first player selection made by the first player via the first player computing device is in response to interaction of the first player with the selection prompt.

6. The method of claim 5, further comprising:
generating the selection prompt based on both: the second player selection, and the one or more criteria for multimedia selection for the matchup.

7. The method of claim 6, wherein generating the selection prompt based on both: the second player selection, and the one or more criteria for multimedia selection for the matchup comprises:
generating the prompt to include suggestions only for selections that are not the same as the second player selection, and that satisfy the one or more criteria for multimedia selection for the matchup.

8. The method of claim 5, further comprising:
generating the selection prompt based on the second player selection, or the one or more criteria for multimedia selection for the matchup.

9. The method of claim 1, wherein identifying the one or more criteria for the multimedia selection for the matchup includes:
transmitting a prompt to the first player computing device, wherein the prompt presents the first player with:
a selection option that enables the user to define the one or more criteria for the multimedia selection for the matchup and causes the second player to first make a selection that satisfies the one or more criteria, and
a deferral option that enables the second player to define the one or more criteria for the multimedia selection for the matchup and causes the first player to first make a selection that satisfies the one or more criteria;
in response to selection of the deferral option via the first player computing device:
transmitting, to the second player computing device, a criteria prompt that prompts the second user to define the one or more criteria for the multimedia selection for the matchup; and
receiving, in response to the criteria prompt, the one or more criteria for the multimedia selection for the matchup.

10. The method of claim 1, wherein the first player selection is a first set list that defines a plurality of first songs and a sequence for the first songs, and wherein the second player selection is a second set list that defines a plurality of second songs and a sequence for the second songs.

11. The method of claim 10, wherein the one or more criteria for the multimedia selection for the matchup include one or more of: at least one original artist criteria, and at least one temporal criteria.

12. The method of claim 11, wherein the one or more criteria for the multimedia selection for the matchup include the at least one temporal criteria, and wherein the at least one temporal criteria defines at least one calendar year.

13. The method of claim 1, wherein the first player selection is a first music video that is a cover version of a first song by an original artist, and wherein the second player selection is a second music video that is a cover version of a second song by the original artist.

14. The method of claim 13, wherein the one or more criteria for the multimedia selection for the matchup include the original artist, and wherein identifying the one or more criteria comprises automatically identifying the original artist based on recent death of the original artist.

15. The method of claim 1, wherein providing indications of the first player selection and the second player selection to the one or more judges comprises:

providing an indication of the first player selection to the second player and to the players of the group of players that are not the first player and are not the second player; and providing an indication of the second player selection to the first player and to the players of the group of players that are not the first player and are not the second player.

16. The method of claim 1, further comprising:

receiving, via the communication network, a third player selection made by a third player via a third player computing device, wherein the third player selection is an indication of one or more multimedia files that satisfy the one or more criteria for multimedia selection for the matchup;

providing indications of the third player selection to at least the first player and the second player; and receiving, in response to providing the indications of the third player selection, ratings of the third player selection by at least the first player and the second player;

wherein determining the winner of the matchup is further based on the ratings of the third player selection.

17. A system, comprising:

at least one network interface;

memory storing instructions; and one or more processors operable to execute the instructions in the memory, wherein the instructions comprise instructions to:

determine a matchup of at least a first player and a second player of a group of players;

identify one or more criteria for multimedia selection for the matchup;

receive, via the at least one network interface, a first player selection made by the first player via a first player computing device, wherein the first player selection is an indication of one or more multimedia files that satisfy the one or more criteria for multimedia selection for the matchup;

provide, via the at least one network interface, a second player computing device of the second player with an indication of the one or more criteria for multimedia selection for the matchup;

receive, via the at least one network interface in response to providing the indication, a second player selection made by the second player via the second player computing device, wherein the second player selection is an additional indication of one or more additional multimedia files that satisfy the one or more criteria for multimedia selection for the matchup;

provide, via the at least one network interface, indications of the first player selection and the second player selection to corresponding computing devices of one or more judges, the one or more judges including players of the group of players that are not the first player and are not the second player;

receive, via the at least one network interface in response to providing the indications to the judges, ratings of the first player selection and the second player selection by each of one or more players of the group of players that are not the first player and are not the second player;

determine a winner of the matchup based on the ratings; and transmitting, via the at least one network interface, a graphical interface that identifies the winner of the matchup, the graphical interface transmitted for presentation to one or more of the players of the group of players.

* * * * *